(12) United States Patent
Gardner, Jr.

(10) Patent No.: US 6,753,057 B1
(45) Date of Patent: Jun. 22, 2004

(54) TRIM ARTICLES WITH LIGHT STABLE COVERING CONTAINING INVISIBLE TEAR SEAM, AND PROCESS OF MAKING THE SAME

(75) Inventor: John A. Gardner, Jr., Deerfield, NH (US)

(73) Assignee: Magna Interior Systems, Inc., Aurora (CA)

( * ) Notice: Subject to any disclaimer, the term of this patent is extended or adjusted under 35 U.S.C. 154(b) by 0 days.

(21) Appl. No.: 09/394,032

(22) Filed: Sep. 13, 1999

Related U.S. Application Data

(60) Provisional application No. 60/100,124, filed on Sep. 14, 1998.

(51) Int. Cl.[7] ............................................. B60R 21/20
(52) U.S. Cl. .................. 428/43; 280/728.3; 280/730.1; 280/731; 280/732; 280/752; 428/68; 428/131; 428/137; 428/138; 428/221
(58) Field of Search ............................ 428/43, 68, 131, 428/137, 138, 221; 280/728.3, 732, 752, 731, 730.1

(56) References Cited

U.S. PATENT DOCUMENTS

| | | | |
|---|---|---|---|
| 5,203,586 A | 4/1993 | Niwa et al. | 280/728 |
| 5,288,103 A | 2/1994 | Parker et al. | 280/728 R |
| 5,344,183 A | 9/1994 | Hersman et al. | 280/728 B |
| 5,421,608 A | 6/1995 | Parker et al. | 280/728.3 |
| 5,429,784 A | 7/1995 | Iannazzi et al. | 264/126 |
| 5,567,375 A | 10/1996 | Filion et al. | 264/251 |
| 5,590,903 A | 1/1997 | Phillion et al. | 280/728.3 |
| 5,797,619 A | 8/1998 | Bauer et al. | 280/728.3 |
| 5,885,662 A | 3/1999 | Gardner, Jr. | 427/426 |

FOREIGN PATENT DOCUMENTS

| | | |
|---|---|---|
| CA | 2163829 | 5/1996 |
| DE | 41 26 183 | 2/1992 |
| DE | 714814 A1 | 6/1996 |
| WO | WO 98/57790 | 12/1998 |

*Primary Examiner*—Nasser Ahmad
(74) *Attorney, Agent, or Firm*—Rader, Fishman & Grauer PLLC

(57) ABSTRACT

A panel structure is mountable in a vehicle to form a part of the interior thereof in concealing relation to a secondary restraint system. The novel panel structure of this invention includes a layered composite structure and a reinforcing substrate having a door structure movable through the layered composite structure upon the operation of the secondary restraint system. The layered composite structure includes an outer layer and an inner layer adhered to the outer layer, the inner layer including a seam-defining structure. In one embodiment, the seam-defining structure is a narrow elongated structure configured to define an exteriorly invisible tear seam generally corresponding with portions of an outline of the door structure, and the inner layer has a reduced thickness portion along the exteriorly invisible tear seam by virtue of the presence of the narrow elongated structure. In another embodiment, the seam-defining structure is a sheet structure severed to define an exteriorly invisible tear seam generally conforming to an outline of the movable door structure. The invisible tear seam defined by the narrow elongated structure or the severed sheet structure causes the layered composite structure to fracture generally along the invisible tear seam in response to the movement of the door structure through the layered composite structure during the operation of the secondary restraint system.

7 Claims, 12 Drawing Sheets

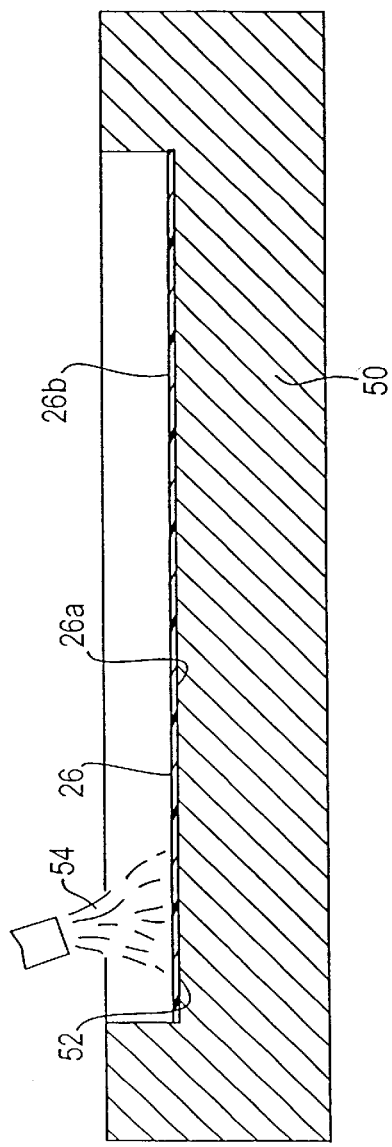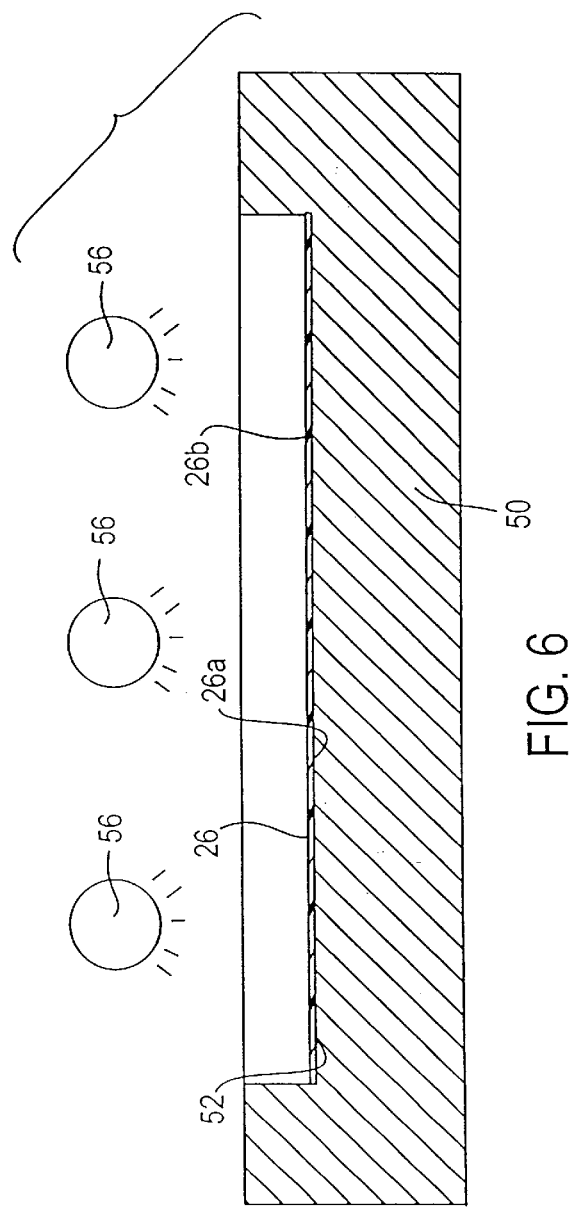

TRIM ARTICLES WITH LIGHT STABLE COVERING CONTAINING INVISIBLE TEAR SEAM, AND PROCESS OF MAKING THE SAME

Priority is claimed based on U.S. Provisional Application No. 60/100,124 filed on Sep. 14, 1998, the complete disclosure of which is incorporated herein by reference.

FIELD OF INVENTION

This invention relates to interior trim articles containing a panel structure mountable in a vehicle to form a part of the interior thereof, and in particular to automobile interior trim articles, such as instrument panels and door panels, which conceal a secondary restraint system including an air bag. This invention further relates to a process for making the aforementioned interior trim articles.

BACKGROUND OF THE INVENTION

The escalation of the commercial significance of air bag restraint systems in automobiles as secondary restraint systems has manifested itself in the appearance of air bag restraint systems in many, if not most, new automobiles. The commercial impact of such secondary systems is attributable both to government regulations and consumer demand for safety.

Generally, air bag restraint systems are concealed from view during normal operation of the vehicle by arranging the air bag restraint systems behind automotive interior trim articles, such as instrument panels and/or door panels.

In order to permit the deployment of the air bags upon collision of the vehicle, interior trim articles are often formed with a multi-layered structure comprising a rigid substrate having hidden doors formed therein, an outer decorative skin layer, and a soft cellular polyurethane foam layer formed therebetween. The hidden doors of the rigid substrate are configured and arranged in such a manner that the edges of the doors define discernible patterns, such as patterns in the form of H, C, U, and X shapes.

During deployment of the air bag, the air bag is actuated via a gas generating system and expands from a folded, undeployed state to an inflated, deployed state. The expansion of the gas inflates the air bag against the backside of the hidden doors and forces the hidden doors to open into the passengers' compartment of the vehicle. The emergence of the hidden doors into the passengers' compartment creates a passageway which permits deployment of the air bag into the passengers' compartment of the vehicle. The deployed air bag protects the driver and passenger from violent collision against the panel structure.

In order to minimize obstruction of the passageway through which the expanding air bag traverses, the underside of the outer skin can be provided with structurally weakened tear seams. These tear seams often take the form of perforated or channel-like patterns, and are constructed and arranged to substantially correspond to and overlay the pattern (e.g., H-shaped) defined by the edges of the hidden doors of the substrate. During deployment of the air bag, the outer skin tears or fractures along the structurally weakened tear seams. Absent the presence of such structurally weakened tear seams in the outer skin, the outer skin may possess sufficient internal strength to resist fracture upon deployment of the rapidly expanding air bag. If the skin does not fracture, the entire outer skin can become separated from the rigid substrate and/or the multi-layered structure can be dismounted from the vehicle frame, thereby imperiling the safety of the driver and passengers.

Different techniques have been proposed to form a multi-layered structure having an outer skin with a structurally weakened, rupturable tear seam. One conventional technique involves the preparation of a rotational-cast poly(vinyl chloride) ("PVC") skin by providing a powder box including a seam-defining structure or gasket, which partitions the powder box into two chambers. A PVC powder with appropriate colorants and additives, such as plasticizers, is retained in each of the chambers. Where a dual-tone appearance is desired, the chambers can be supplied with PVC powders containing different colorants, in which case the seam-defining structure simultaneously serves as a color division rim. The powder box is then engaged to a metal mold component to define a closed casting system having the seam-defining structure closely spaced from a heated mold surface of the metal mold component. The PVC powder is then tumbled against a heated molding surface of the metal mold by a rotational casting method until the PVC powder is formed against a moderately heated mold surface in a gelled state. Excess powder collects in the powder box, and is thereafter separated and removed from the mold. Since the seam-defining structure obstructs the gelling of PVC powder on the portion of the heated mold surface therebelow, the structurally weakened portion of the skin is formed below the seam-defining structure. A lower density or lower strength tear seam material (also referred to as a filler material) is then sprayed into the perforated or channel-like seams and gelled. The gelled PVC material and the gelled tear seam material are then fused by heating the materials to their fusion temperatures, and thereafter cooled to provide the PVC-based covering in a thermoplastic solid state. The skin can then be united with the rigid substrate, such that the low density material of the outer skin is positioned to substantially correspond to and overlay the edges of the hidden doors.

There are at least two problems associated with the above-described conventional method. First, the presence of the seam-defining structure hinders the normal compacting of the PVC powder which occurs during rotation of the closed system. Hence, the portion of the skin layer corresponding to the structurally weakened tear seam possesses a greater porosity than the remainder of the skin. The difference in porosity between the structurally weakened portion and the remaining portion of the outer skin makes the pattern of the tear seam visible, especially in bright light. The second problem is due to the difference in composition of the cast skin and the sprayed tear seam material. In top-mount applications in which the tear seam is exposed to high temperatures and intense UV radiation, the sprayed material introduced into the tear seam ages differently than the surrounding cast material and will become clearly visible over time. For these reasons, multi-layered structures made by the aforementioned conventional method are only effectively employed in mid mount applications where the hidden tear seam is not exposed to direct sunlight.

In order to overcome these problems, it has been proposed to form a PVC skin layer of uniform thickness, and thereafter form the structurally-weakened tear seams by laser cutting the backside of the skin. Due to the relatively small thickness of the skin, however, it is very difficult to precisely control the depth of the cut portion. Consequently, errors in laser cutting can lead to the disposal of skins as unusable scrap. In addition, the capital investment associated with obtaining and operating a laser cutting apparatus is very high.

A need therefore exists to provide a process for making a panel structure containing a decorative covering having an inner surface with a structurally weakened tear seam in which the tear seam is concealed from view, even after employing the covering in top mount applications which subject the covering to prolonged use and exposure to high temperatures and intense UV radiation.

SUMMARY OF THE INVENTION

The disadvantages of the prior art may be overcome by providing a process for making a panel structure comprising a layered composite structure and a reinforcing substrate including a door structure movable through a portion of the layered composite structure upon the operation of the secondary restraint system. The panel structure is mountable to a vehicle to form a part of the interior thereof in concealing relation to a secondary restraint system.

In accordance with one embodiment of this inventive process, the layered composite structure is formed on a mold surface, the layered composite structure comprising an outer layer with an exterior surface having an opaque visual appearance, a seam defining structure configured to define an exteriorly invisible tear seam generally corresponding with portions of an outline of the door structure movable through the layered composite structure during the operation of the secondary restraint system, and an inner layer having a frangible line along the exteriorly invisible tear seam by virtue of the presence of the seam defining structure. The layered composite structure is united with the reinforcing substrate so that the reinforcing substrate reinforces the layered composite structure in such a way that the narrow elongated structure and the reduced thickness portion of the inner layer along the invisible tear seam causes the layered composite structure to fracture generally along the invisible tear seam in response to the movement of the door structure through the layered composite structure during the operation of the secondary restraint system. Optionally, a soft cellular foam layer can be interposed between the layered composite structure and the reinforcing substrate.

In accordance with another embodiment of this inventive process, the layered composite structure is formed on a mold surface and comprises an outer layer with an exterior surface having an opaque visual appearance and an inner layer adhered to the outer layer and including a seam defining structure in the form of a severed sheet structure through which the door structure moves during the operation of the secondary restraint system. The layered composite structure and the substrate are united so that the substrate reinforces the layered composite structure. The sheet structure is severed to define an exteriorly invisible tear seam generally corresponding with portions of an outline of the door structure. The severed portion defining the invisible tear seam causes the layered composite structure to fracture generally along the invisible tear seam in response to the movement of the door structure through the layered composite structure during the operation of the secondary restraint system. A soft cellular foam layer optionally can be interposed between the layered composite structure and the reinforcing substrate.

Other objects of the invention are achieved by providing an article comprising a panel structure made by the above-mentioned embodiments of the inventive process of this invention.

Since the layered composite structures provided in accordance with the above-discussed embodiments have an outer layer that can be uniformly sprayed onto heated mold surface without requiring a seam-defining structure for forming a structurally weakened seam in the outer layer, the outer layer of the composite structure does not exhibit the non-uniform porosity that characterizes conventional skins. Further, the outer layer assists in masking and concealing the non-uniform porosity and/or differentials in aging between the portion of the layered composite structure defining the structurally weakened tear seam.

The layered composite structure of this invention also exhibits excellent chemical, scuff and mar resistance to external influences. Further, appropriate additives can be introduced into one or more of the layers of the layered composite structure to provide the composite structure with the non-reflective and low gloss surface appearance desired for such panel-like structures.

Furthermore, both the inner and outer layers of the layered composite structure are characterized by excellent extensibility, such that the layered composite structure can withstand indentation and flexure during use without resulting in cracking in the outer layer over a wide temperature range, such as from −30° C. to 120° C.

The principles of this invention enunciated above are applicable to all types of skinned panel structures through which an air bag might deploy, but have particular applicability to instrument panels (also referred to as dashboards), door panels, steering wheels, pillar covers, headliners, and rear interior quarter panels. Moreover, the principles of this invention are applicable to various types of automotive vehicles, including passenger cars, trucks, vans, utility vehicles, and others.

BRIEF DESCRIPTION OF THE DRAWINGS

The accompanying drawings illustrate this invention. A first embodiment of the invention is illustrated in FIGS. 1–12, in which:

FIG. 5 is a sectional view of a mold surface showing a step of applying a water-dispersed polyurethane composition to a heated mold surface to form a partially crosslinked light-stable polyurethane outer layer;

FIG. 6 is a sectional view similar to FIG. 5 showing a step of drying the polyurethane outer layer;

Figure 13:
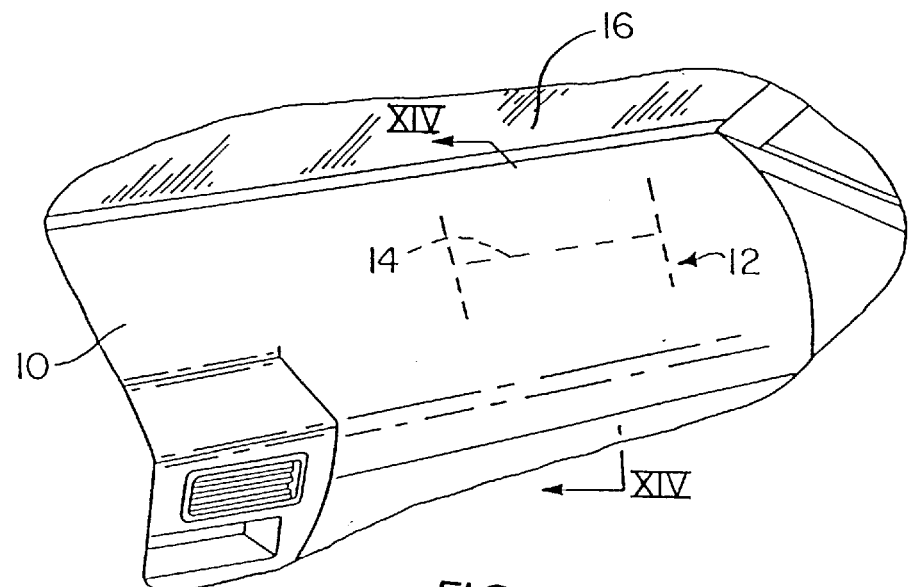
Figure 14:
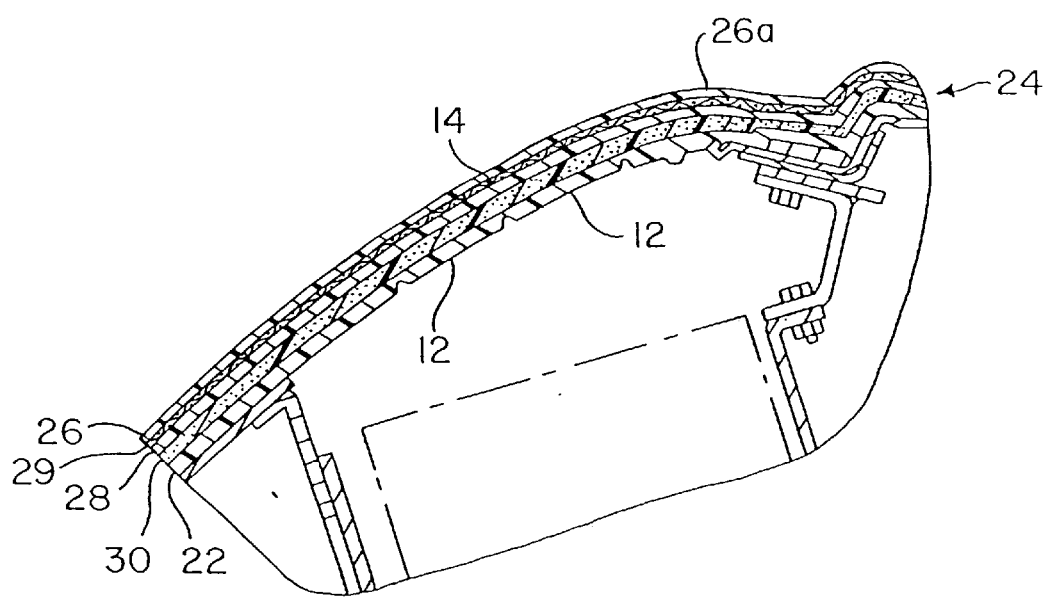
Figure 15:
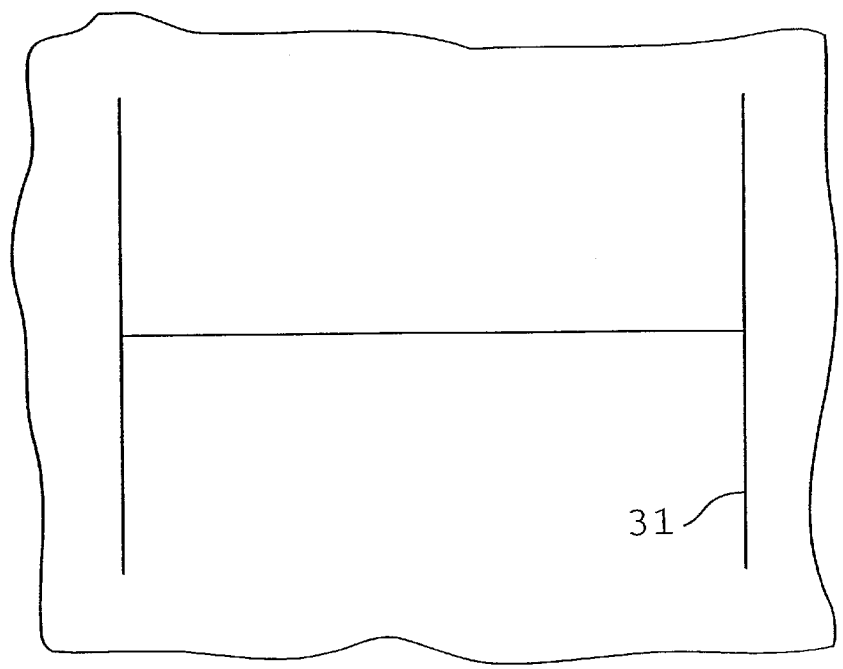
Figure 16:
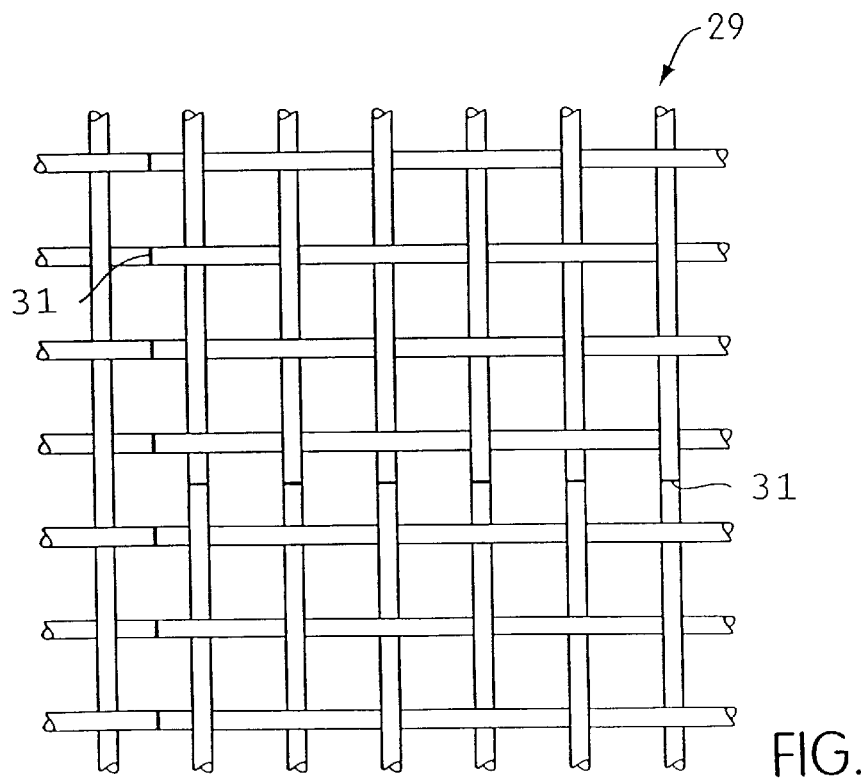
Figure 17:
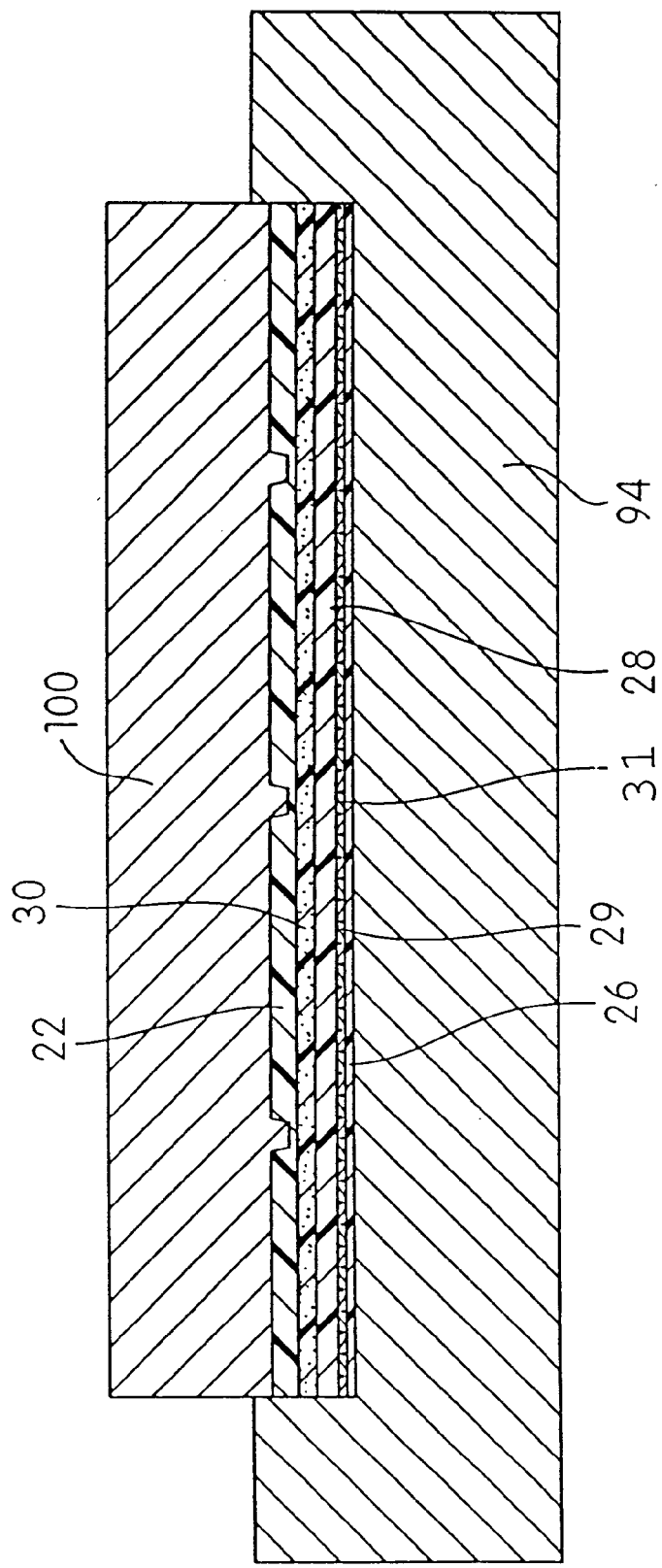
Figure 18:
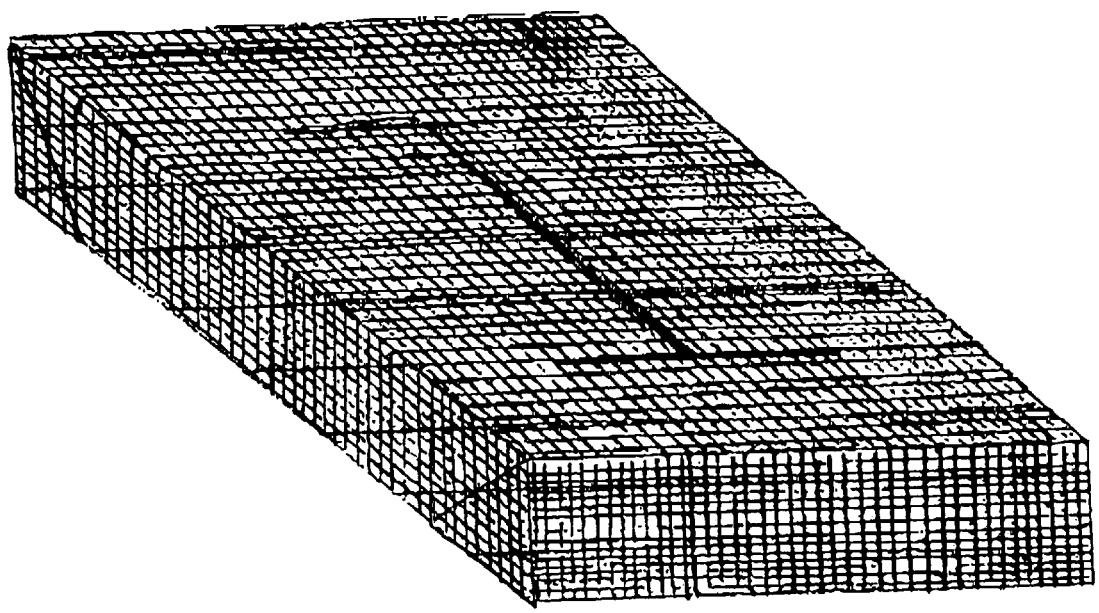

A second embodiment of the invention is illustrated in FIGS. 13–18, in which:

FIG. 13 is a perspective, partially phantomed view of a completed vehicle instrument panel constructed in accordance with a second embodiment of this invention;

FIG. 14 is a sectional view of the instrument panel of a FIG. 13 taken along line XIV—XIV;

FIG. 15 is a depiction of one construction and arrangement of a thin sheet structure of the second embodiment;

FIG. 16 is a depiction of another construction and arrangement of a thin sheet structure of the second embodiment;

FIG. 17 is a sectional view showing a step of uniting the layered composite structure on the second mold surface with a pre-formed relatively rigid substrate disposed on a third mold surface; and FIG. 18 is a depiction of another construction and arrangement of a thin sheet structure of the second embodiment.

DETAILED DESCRIPTION OF THE INVENTION

Figure 1:
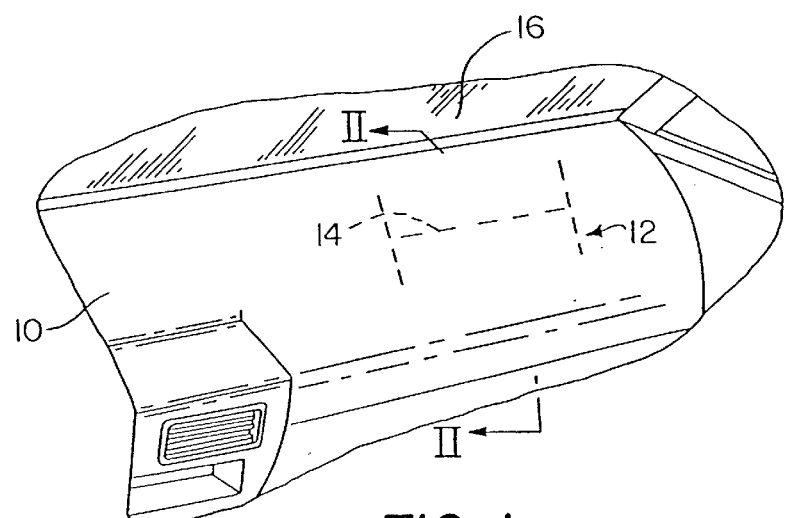
FIG. 1 is a perspective, partially phantomed view of a completed vehicle instrument panel constructed in accordance with a first embodiment of this invention.

Referring now more particularly to the drawings, there is shown in FIG. 1 a panel structure comprising a vehicle instrument panel, generally designated by reference numeral 10, made by a method in accordance with a first embodiment of this invention.

In this embodiment of the invention, the panel structure 10 is shown in a top mount position. The structure 10 includes pivotal doors 12 having edges that define a hidden H-shaped pattern 14. In this top mount position, the panel structure 10 underlays a sloped windshield 16. Although shown in the upper portion of the instrument panel 10, it is understood that the doors 12 could also be formed in the front portion of the instrument panel 10, which constitutes a mid mount position.

Figure 2:
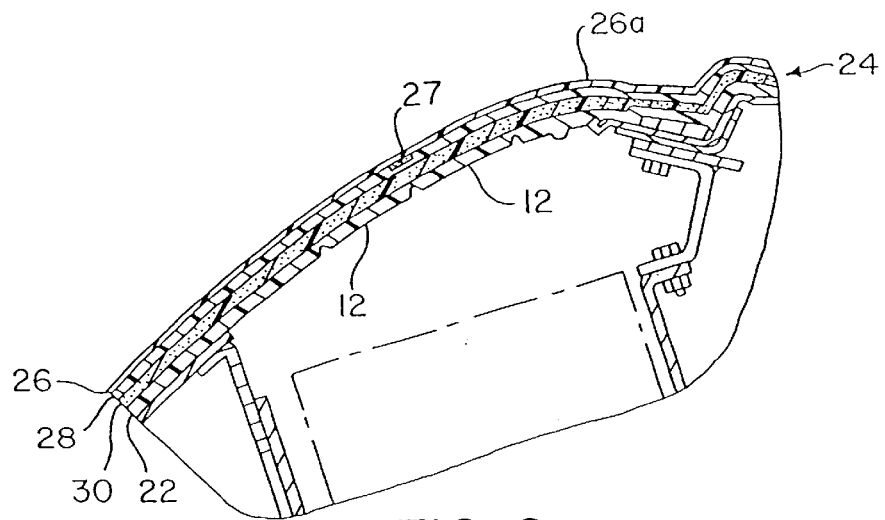
FIG. 2 is a sectional view of the instrument panel of a FIG. 1 taken along line II—II.
Figure 3:
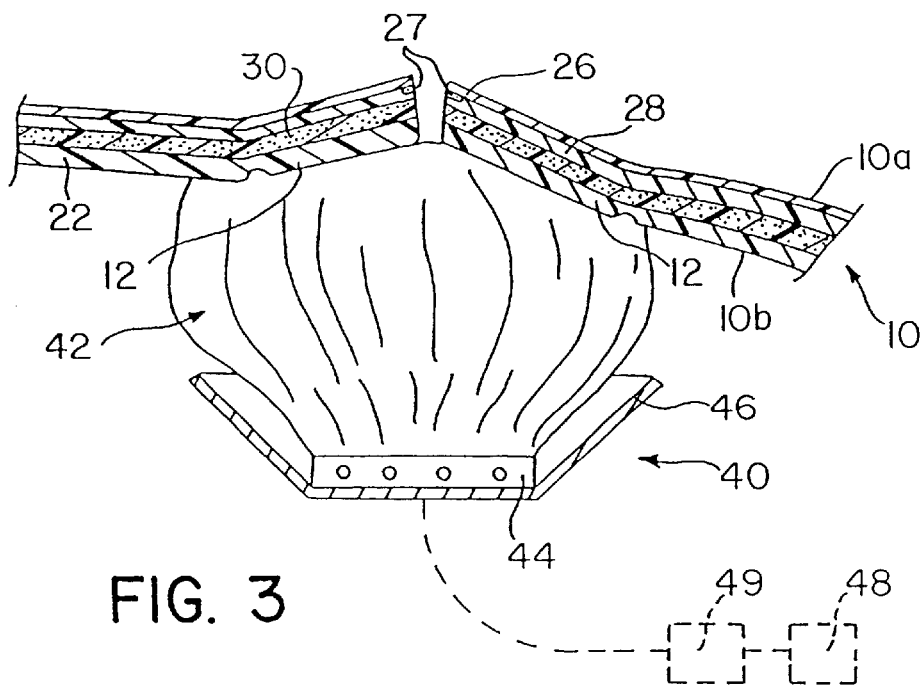
FIG. 3 is a sectional view showing the air bag in a partially inflated deployment position.

As shown in cross-section in FIGS. 2 and 3, the panel structure 10 has an exterior surface 10a exposed to the vehicle interior and an interior surface 10b which is hidden from the vehicle interior when the panel structure 10 is mounted in the automobile vehicle. The panel structure 10 includes a rigid (or reinforcing) substrate 22 having one surface defining the interior surface 10b of the panel structure 10. A portion of the substrate 22 defines the pivotal doors 12. Alternatively, the pivotal doors 12 can be formed separately from the substrate 22, and attached to the substrate 22 via, for example, hinges or the like (not shown). In the illustrated embodiment, when viewed from the backside of the substrate 22, the doors 12 define an H-pattern; however, it is understood that the doors 12 can define other patterns and can be displaced by other means (other than pivotal movement). For example, other possible patterns include X, C, U, and inverted U shapes.

The panel structure 10 further includes a layered composite structure, generally designated by reference numeral 24 (FIG. 2), comprising an outer layer 26 having an outer surface 26a defining at least a portion of the exposed exterior surface 10a (FIG. 4) of the panel structure 10, a seam defining structure, namely a thin narrow elongated structure 27, and an inner layer 28. At least a portion of the outer layer 26 is exposed to the vehicle interior, while a portion of the outer layer 26 may be hidden from view by a decorative or other masking item. An intermediate layer 30 comprising a relatively rigid (or semi-rigid) polyurethane cellular foam is interposed between the layered composite structure 24 and the substrate 22.

The inner layer 28, which is relatively thick in comparison to the outer layer 26, has an outer surface adjacent to both a portion of an inner surface 26b of the outer layer 26 and the narrow elongated structure 27. Preferably, the inner layer is interfacially chemically bonded with the outer layer 26. The narrow elongated structure 27 preferably has a shape that substantially corresponds to the shape of the edges of the doors 12 that part from the substrate 22 during pivoting movement of the doors 12 (e.g., an H-shape in the illustrative embodiment). Generally, the narrow elongated structure 27 can be made of a material having a lower tensile strength than that of the inner layer 28. Preferably, the tensile strength of the narrow elongated structure 27 is about 50% lower than that of the inner layer 28, thus defining a frangible line or an inherent line of weakness. The density and/or tensile strength of the elongated structure 27 can be lowered by including silica, glass beads, talc, and other fillers, and/or by adding blowing agents, such as azo-blowing agents, into the elongated structure 27. The elongated structure 27 is made of or coated with a material which is chemically and adhesively compatible with the material of the inner layer 28.

In the illustrated embodiment of FIG. 3, an air bag deployment system 40 used in combination with this invention can include any conventional system disposable behind a panel-like structure and capable of deploying an air bag 42 at an adequate rate to protect the vehicle occupants. A typical system 40 can include, for example, a stationary gas generator or canister 44 situated in a housing 46 mounted on a suitable vehicle component (not shown). When the vehicle is impacted, an impact sensor 48 actuates the gas generator 44, causing the gas generator 44 to condition a controller 49 to initiate gas generation and expel a suitable inflatant gas into the air bag 42.

Figure 4:
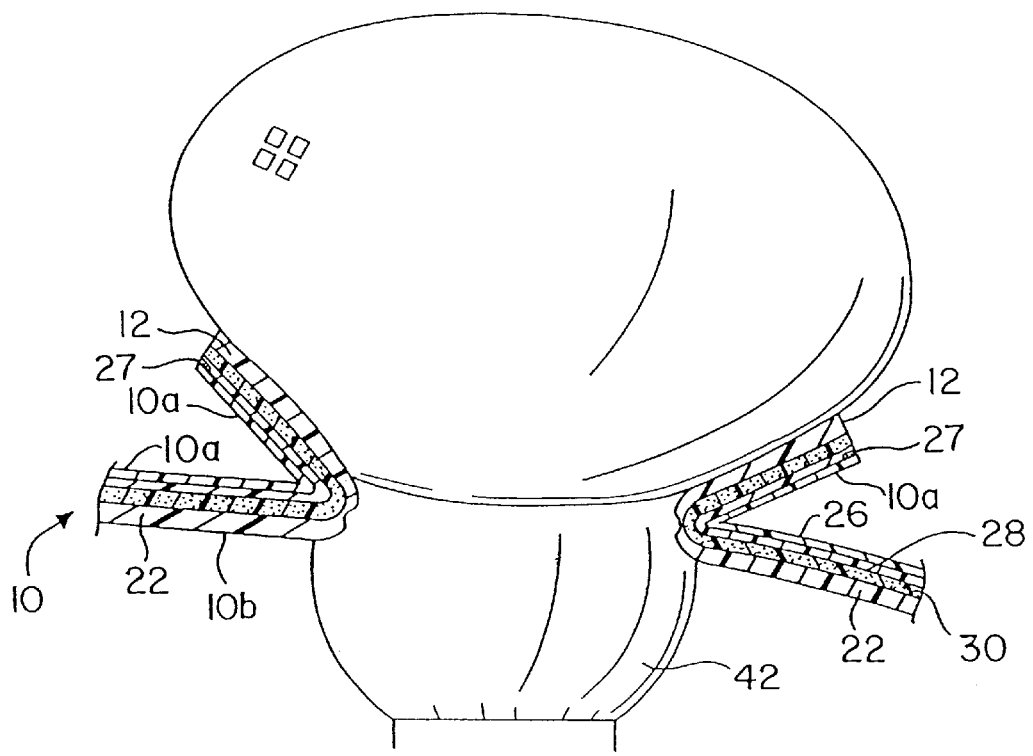
FIG. 4 is a sectional view like FIG. 3, except showing the air bag in a fully inflated deployment position.

As shown in FIGS. 3 and 4, as the air bag 42 is inflated from its folded, undeployed state to a fully inflated, deployed state, the expanding air bag 42 impacts against the backside of the panel structure 10. The force of the impact displaces the doors 12 into the passengers' compartment of the vehicle and thereby fractures the composite structure 24 along the narrow elongated structure 27 to create a passageway (unnumbered). The formed passageway permits expansion of the air bag 42 into the passengers' compartment of the vehicle and protects the occupants from violent collision against the panel structure 10 or windshield 16.

As shown in FIG. 5, the method of this first embodiment is generally described in U.S. Pat. No. 5,885,662 and utilizes a first mold component or part 50 having a first mold surface 52. The first mold component 50 preferably is formulated by electrolytically depositing nickel over a rigid cast epoxy substrate which is secondarily removed at the end of the deposition/plating process to yield a self-supporting mold capable of being mounted and controlled in a tooling module. The first mold surface 52 has a complementary configuration to the desired configuration of the outer layer 26, and is grained to define a texture that substantially complements the desired texture of the outer layer 26 and simulates real leather.

FIG. 5 illustrates the first step in this embodiment in which the outer layer 26 is obtained by applying, preferably by spraying, a water-dispersed composition 54 onto the first mold surface 52. The water-dispersed composition 54 comprises at least one light-stable aliphatic thermoplastic polyurethane containing one or more pendent hydroxyl and/or carboxyl functional groups, at least one desired coloring agent, and at least one heat-activated crosslinker. Suitable crosslinkers include blocked, heat-activated aliphatic diisocyanates, carbodiimide (H—N=C=N—H), also known as cyanamide, and compounds having a plurality of aziridine groups. The average molecular weight of the thermoplastic polyurethane can be in a range of from about 5000 to about 7000, and more preferably about 6000. An exemplary thermoplastic polyurethane and blocked, heat-activated aliphatic diisocyanate can be obtained from Titan Finishes Corp. of Detroit, Mich. under the trade designation PROTOTHANE WR, WATER BASED IN-MOLD COATING. The aliphatic diisocyanate may be cyclic or non-cyclic, but should be light stable. As referred to herein, diisocyanates also encompasses prepolymers having two —NCO groups which are reactive with the thermoplastic polyurethane.

An exemplary aliphatic diisocyanate is hexamethylene diisocyanate (HMI), which is available from Bayer, Rhone Poulenc, and Nippon Polyurethane. An exemplary water-dispersed composition comprising a thermoplastic polyurethane and carbodiimide can be obtained from C. F. Jameson & Company, Inc. of Bradford, Mass. under the trade designation JAMESON WVF SERIES FLEXCOAT IMC. The desired weight ratio of thermoplastic polyurethane to crosslinker for these particular compositions is about 8 to 1 by volume (equivalent ratio of 1.44 thermoplastic polyurethane to 1.08 crosslinker on a dry basis).

The water-dispersed composition 54 can be prepared by providing the thermoplastic polyurethane component as a colloidal solution in a solvent such as N-methyl pyrrolidone, then dispersing the solution by adding water, the coloring agent, and conventional additives, if desired. Sufficient water (e.g., about 61.1% by weight) can be added so that the solvent concentration in the water-dispersed composition 54 is, for example, about 8.1% by weight before drying.

The optional additives in the water-dispersed composition 54 can include, without limitation, any combination of the following: heat and ultra-violet light stabilizers, pH stabilizers to maintain an alkaline state of dispersion, plasticizers, antioxidants, dulling agents, surfactants, colloidal protectants to maintain particles in suspension, carbon black, thixotropic agents (e.g., hydroxy methyl cellulose), and fillers such as clay particles.

The water-dispersed composition 54 can contain, for example, about 25% to about 35% solids by weight, and more preferably about 29% solids by weight, about 10% to about 80% water by weight, and more preferably about 61% water by weight, and about 6% to 10% solvents by weight, depending on desired color and additives. An insufficient amount of water in the composition 54 can adversely affect the viscosity of the composition 54 and thus adversely affect the application of the water-dispersed composition 54 onto the first mold surface 52. On the other hand, an excess amount of water in the water-dispersed composition 54 can alter the sprayability and coating efficiency of the water-dispersed composition 54.

To the thermoplastic polyurethane solution may be added a solution of the blocked, heat-activated aliphatic diisocyanate, which can include as a solvent, for example, 1-methyl-2-pyrrolidine and/or 4-hydroxy-4-methyl-2-pentanone. A discussion of blocked isocyanates is included in Practical Chemistry of Polyurethanes and Diisocyanates, Akron Polymer Laboratories, David Russell (1991), the complete disclosure of which is incorporated herein by reference. The blocked, heat-activated aliphatic diisocyanate is preferably maintained at room temperature and protected from heat until use. When influenced by the heat, such as the heat of the tooling during spraying application, the blocked, heat-activated aliphatic diisocyanate reacts with the hydroxyl and/or carboxyl groups of the thermoplastic polyurethane to crosslink the thermoplastic polyurethane with itself or with polyol constituents of the rapidly reacting composition.

Alternatively, the water-dispersed composition 54 can be prepared by adding to the thermoplastic polyurethane solution a solution comprising the carbodiimide, which can include, for example, glycol ether acetate and/or xylene as the solvent.

The water-dispersed composition 54 can be prepared by withdrawing the light-stable thermoplastic polyurethane and the heat-activated crosslinker from separate storage chambers in continuous, metered streams, and mixing these constituents immediately prior to contact with the first mold surface 52. Alternatively, the light-stable aliphatic thermoplastic polyurethane and the crosslinker constituents can be stably premixed, or "hot-potted", for up to about 24 hours at room temperature before application. This technique is known as "hot-potting" since the thermoplastic polyurethane and crosslinker slowly react with each other at room temperature in a spray pressure pot. If the admixture is hot-potted for more than about 24 hours at room temperature before application of the water-dispersed composition 54 onto the first mold surface 52, the resulting crosslinked light-stable polyurethane exhibits inferior solvent and wear resistance properties and extensibility and may not provide an idealized bond to the inner layer 28. The water-dispersed composition 54 may be formed from a colloidal solution of resin particles, which is added to water to disperse the resin particles in the water.

Application of the water-dispersed composition 54 onto the heated first mold surface 52 induces chemical reaction between the pendent hydroxyl and/or carboxyl functional groups of the light-stable thermoplastic polyurethane and the heat-activated crosslinker to thereby produce a partially crosslinked light-stable polyurethane. The first mold surface 52 should be heated to a sufficient temperature to drive the crosslinking reaction, but should not be so high as to cause delamination of the composition 54 from the mold surface 52. Preferably, the first mold surface 52 is heated to a temperature in a range of from about 60° C. (140° F.) to about 71.1° C. (160° F.). The heating of the first mold surface 52 to such elevated temperatures prior to application of the water-dispersed composition 54 thereto also serves to melt and disperse semi-permanent mold releasing agents, such as microcrystalline wax mold releasing agents, applied to the first mold surface 52. The heated mold surface 52 evaporates the wax dispersants and leaves a thin residue that does not collect in the intricate grain detail of the first mold surface 52.

Once the crosslinked light-stable polyurethane has been formed on the first mold surface 52, the water-dispersed composition 54 is substantially dried while being retained on the first mold surface 52 to obtain the outer layer 26. As shown in FIG. 6, the partially crosslinked light-stable polyurethane can be subjected to a heat source 56 to induce evaporation of the water and solvent therefrom and coalesce the resin particles to form the outer layer 26 with the outer surface 26a adjacent to the first mold surface 52. Although not shown in FIG. 6, such heat source 56 is preferably integrated with the first mold 50, and preferably heats the first mold surface 52 to an elevated temperature of about 65.6° C. (150° F.) or higher. At least a portion of the outer surface 26a of the outer layer 26 has the desired touch, color, and grain-like configuration of the panel-like structure 10.

Generally, the outer layer 26 has a thickness in a range of from about 0.0025 cm to about 0.0038 cm (that is, from about 0.001 inch to about 0.0015 inch; or from about 1.0 mils to about 1.5 mils). The particular coloring agent selected can directly influence the desired thickness of the outer layer 26. Darker colors, such as grays and browns, usually only require a relatively small film thickness to mask the color of the hidden elongated structure 27 and the inner layer 28, whereas lighter colors such as reds and blues usually dictate the provision of a relatively larger thickness to obtain an opaque, non-transparent outer layer 26 that conceals the structure 27 and the elongated inner layer 28 from view.

In accordance with a variant of the present invention, the outer layer 26 can exhibit a dualtone or multitone appearance. This variant embodiment can be accomplished, for example, by abrasive treatment of a portion of the mold surface of the tooling. The greater the amount of abrasive treatment, the duller the appearance of the outer layer 26. A dualtone appearance can be especially desirable for instrument panels, since the upper region of an instrument panel generally should have a low gloss in order to reduce reflectance and veiling glare.

A secondary or alternative heat source can be applied for activating the reaction between the light-stable thermoplastic polyurethane and the crosslinker. For example, the water-dispersed composition 54 can be preheated before being applied to the first mold surface 52, such that the first mold surface 52 does not have to be heated to initiate the reaction between the crosslinker and the light-stable thermoplastic polyurethane.

Figure 7:
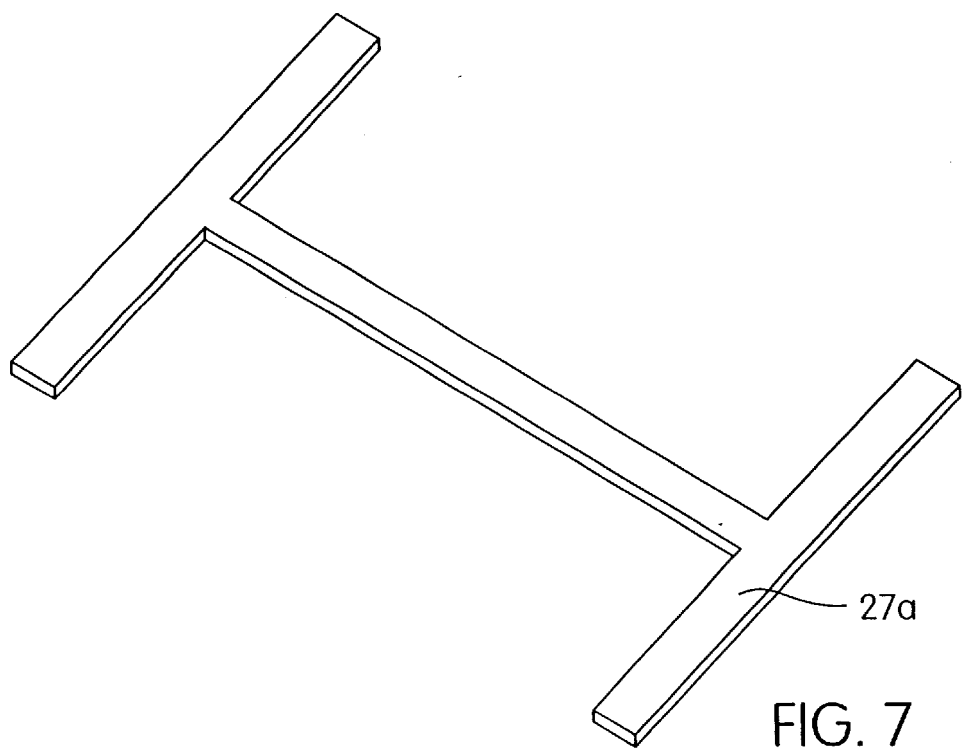
FIG. 7 is a depiction of one construction and arrangement of a narrow elongated structure of the first embodiment.
Figure 8:
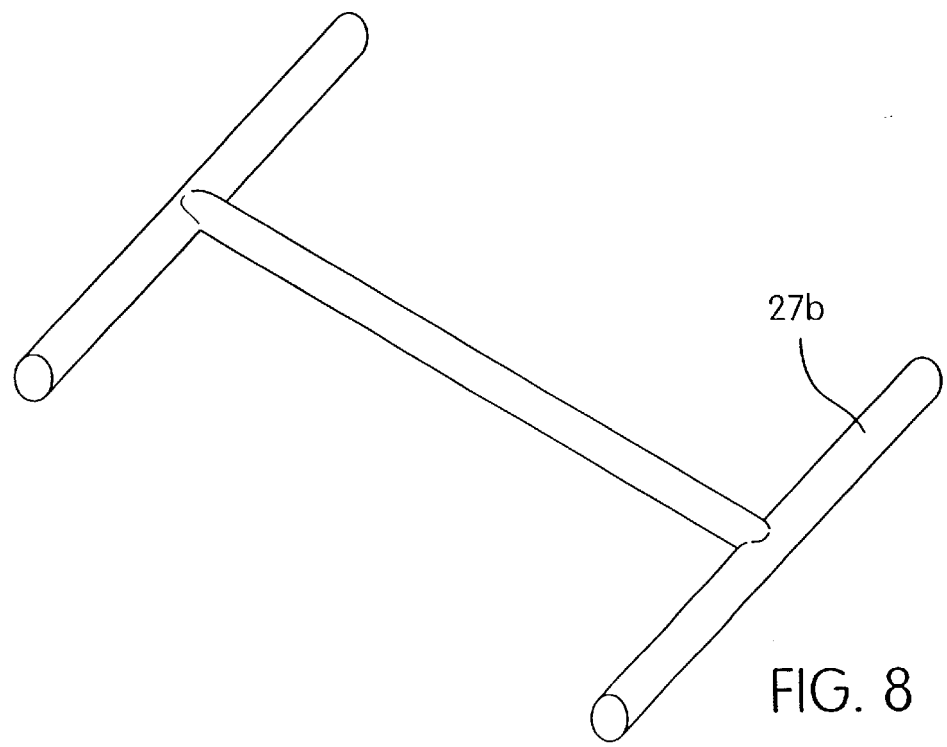
FIG. 8 is a depiction of another construction and arrangement of a narrow elongated structure of the first embodiment.

Referring to FIGS. 7 and 8, there are shown different constructions and arrangements of the seam defining structure. As shown in FIG. 7, according to one embodiment the narrow elongated structure 27a may be a strip of film, and may be made from, by way of example, a thermoplastic material, including, by way of example, a polyester, polyurethane, and/or polyamide (nylon). In one preferred embodiment, the elongated structure 27 is made of MYLAR. The width of the tape may be on the order of from about 2 mm to about 3 mm, and its thickness may be on the order of from about 0.1 mm to about 0.2 mm.

As shown in FIG. 8, the seam defining structure may be in the form of a string or twine. The string or twine may be, for example, from about 1 mm to about 1.5 mm in diameter. Any material that is capable of being formed into a twined configuration to create a disruption into the structure, without introducing a foreign entity that will cause the string or twine to significantly expand or contract over time that might cause "read-through", may be used. Materials that are similar to those selected for the inner layer are preferred. The physical properties, including extensibility, of the twine or string (or the elongated strip) may be selected to cause tearing in the twine or string (or the elongated strip) and/or at the interface of the twine or string (or the elongated strip) and the inner layer 28 in a controlled and predictable way. Accordingly, the twine or string material 27b (or elongated strip 27a) may be non-homogenous, and may have a lesser or greater tensile strength than the inner layer 28. However, the elongated structure 27 should be made of a material that, during and after deployment, will not fragment or be sufficiently stiff to injure the driver or passenger.

Figure 9:
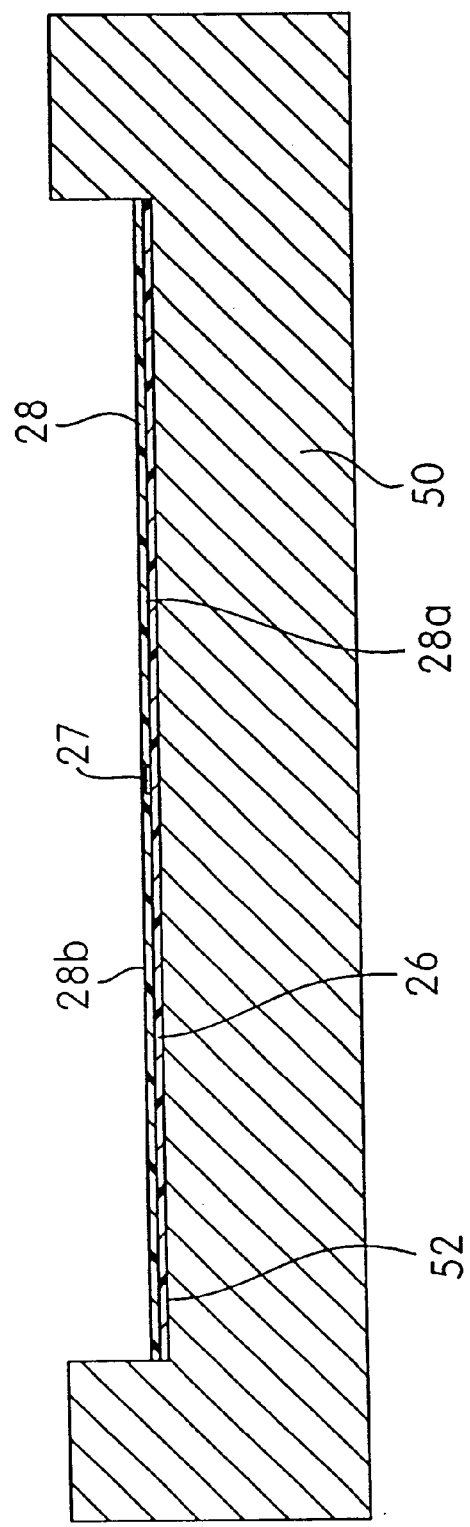
FIG. 9 is a sectional view similar to FIG. 6 showing a layered composite structure formed on the heated mold surface.

Returning to the process, as shown in FIG. 9, the narrow elongated structure 27 is applied onto the inner surface 26b of the outer layer 26. The elongated structure 27 is positioned and configured to define an exteriorly invisible tear seam generally corresponding with a portion of an outline of the doors 12 movable through the layered composite structure 24 during the operation of the secondary restraint system 40. Next, an inner layer 28 is deposited over the inner surface 26b of the outer layer 26 and the thin narrow elongated structure 27 applied thereto while the outer layer 26 is retained on the first mold surface 52 in a substantially dry state. The thin narrow elongated structure 27 adheres to the inner layer 28. The adhesive bond between the elongated structure 27 is inherently less than the interfacial bond between inner layer 28 and outer layer 26 creating a frangible line in the inner layer 28 along the exteriorly invisible tear seam.

Next, the inner layer 28, as is also depicted in FIG. 9, is formed by spraying or otherwise applying a film-forming composition onto the inner surface 26b of the outer layer 26 while the outer layer 26 is retained on the first mold surface 52 in a substantially dry state.

It is to be understood that the above-discussed sequence of applying the narrow elongated structure 27 and the inner layer 28 may be reversed or modified. For example, in one alternative embodiment a first portion of the inner layer 28 is applied onto the inner surface 26b of the outer layer 26 while the outer layer 26 is on the mold surface 52, but before the narrow elongated structure 27 has been applied thereto. The narrow elongated structure 27 is then applied onto the first portion of the inner layer 28 while the first portion is still tacky so that the elongated structure 27 is spaced from the inner surface 26b of the outer layer 26, thereby decreasing the likelihood of "read-through" of the pattern of the elongated structure 27. A second portion of the inner layer 28 is then applied over both the first portion of the inner layer 28 and the narrow elongated structure 27 applied thereto while the outer layer 26 is on the mold surface 52. The second portion of the inner layer 28 can be applied in such a thickness so that the elongated structure is partially exposed or completely encapsulated by the inner layer 28.

In another alternative method, the inner layer 28 is applied on the inner surface 26b of the outer layer 26 while the outer layer 26 is on the mold surface 52, but before the narrow elongated structure 27 has been applied thereto. The narrow elongated structure 27 is then applied on an inner surface 28b of the inner layer 28 (while the inner layer 28 is still tacky and not fully reacted, i.e. in a reactive state) and pressed into the inner layer 28 to embed the narrow elongated structure 27 in the inner layer 28 and create, by virtue of the presence of the embedded narrow elongated structure 27, the exteriorly invisible tear seam. Again, spacing the narrow elongated structure 27 from the inner surface 26b of the outer layer 26 decreases the chance of read-through.

The inner layer 28 can be made from one or more base polymers that can be sprayed or cast by conventional techniques. Suitable base polymers include, for example and without limitation, PVC, thermoplastic polyurethanes, thermoplastic polyolefins, thermoplastic elastomers, and any combination thereof. The composition for forming the inner layer 28 can also contain one or more additives. Preferably, at least one of the base polymers and/or the additives is highly reactive with unreacted, residual functional groups of the crosslinker in the outer layer 26 that have not reacted with the pendent functional groups of the polyurethane of the outer layer 26. Unreacted functional groups of the crosslinker penetrate into the inner layer 28 and provide reactive sites for crosslinking the polyurethane of the outer layer 26 with the inner layer 28. An interfacial chemical bond between the inner surface 26b of the outer layer 26 and the adjacent outer surface 28a of the inner layer 28 can thereby be formed. The layered composite structure 24 is thus obtained. If the crosslinking is performed under optimum crosslinking conditions, the boundary between the outer and inner layers 26 and 28 about the seam defining structure of the layered composite structure 24 can become visually indistinct, such that a transition phase appears at the interface of the two layers. As referred to herein, interfacial chemical bonding encompasses, but is not limited to, such crosslinking reactions in which the interfacial boundary between the outer and inner layers 26 and 28 is visually indistinct and the layers 26 and 28 are inseparable.

In a preferred embodiment, the inner layer 28 is prepared from a polyurethane elastomer, and even more preferably from an aromatic polyurethane elastomer. The polyurethane elastomer inner layer 28 may be formed by spraying a rapidly reacting composition onto the inner surface 26b of the outer layer 26 and optionally the elongated structure 27, which are retained on the first mold surface 52 in a substantially dry state. The rapidly reacting composition preferably contains at least one aromatic polyisocyanate and at least one polyol, which react with each other to form the non-light-stable polyurethane elastomeric inner layer 28. As referred to herein, the term elastomer encompasses a resilient polymer composition stretchable under moderate tension and compressible and having a relatively high tensile strength and memory so that, upon release of the tension, the elastomer retracts into and recovers its original dimensions or dimensions substantially similar to its original dimensions.

In addition to being reactive with the polyisocyanate, the polyol of the rapidly reacting composition can contain one or more pendent hydroxyl and/or carboxyl functional groups that are highly reactive with unreacted functional groups of the crosslinker, which is preferably a blocked, heat-activated aliphatic diisocyanate, in the outer layer 26 that have not reacted with the pendent functional groups of the polyurethane of the outer layer 26. Unreacted functional groups of the blocked, heat-activated light-stable diisocyanate penetrate into the inner layer 28 and react with the pendent functional groups of the polyol constituent. As a result, the blocked, heat-activated light-stable diisocyanate crosslinks the polyurethane of the outer layer 26 with the polyurethane elastomer of the inner layer 28 and thereby forms an interfacial chemical bond between the inner surface 26b of the outer layer 26 and the adjacent outer surface 28a of the inner layer 28. The layered composite structure 24 is thus obtained.

Generally, provisions should be taken to ensure that an adequate interfacial chemical bond is achieved between the inner surface 26b of the outer layer 26 and the adjacent outer surface 28a of the inner layer 28. For example, once the blocked, heat-activated light-stable diisocyanate is activated by heat, the crosslinking reaction between the heat-activated diisocyanate and the pendent hydroxyl and/or carboxyl reactive groups of the thermoplastic polyurethane goes to completion within minutes, leaving the heat-activated light-stable diisocyanate with substantially no residual reactive sites for crosslinking the polyurethane of the outer layer 26 with the polyol of the rapidly reacting composition. Therefore, the rapidly reacting composition generally should be sprayed within six minutes, and preferably within two to four minutes, of completing the application of the water-dispersed composition 54 to the first mold surface 52. Significant delays in spraying the rapidly reacting composition also can cause the outer layer 26 to constrict and delaminate from the first mold surface 52. As a consequence of delamination, the outer layer 26 will not have a shape complementary to the configuration of the first mold surface 52, and the entire composite 24 will have to be disposed of as scrap.

On the other hand, if the thermoplastic polyurethane of the water-dispersed composition 54 is not given sufficient time to crosslink before the rapidly reacting composition is sprayed thereon, the polyol component of the rapidly reacting composition can undergo a condensation reaction with unreacted hydroxyl and/or carboxyl pendent functional groups of the polyurethane of the outer layer 26 to form ester or ether linkages, respectively. While some formation of these linkages can advantageously enhance the interfacial chemical bond, the condensation reactions release water, which in excess amounts can undesirably increase the cellularity of the inner layer 28 and interfere with the interfacial chemical bond.

The interfacial chemical bond is further enhanced by separately storing the highly reactive polyol and aromatic polyisocyanate components of the rapidly reacting composition in separate storage chambers and spraying these components on the inner surface 26b of the outer layer 26 so as to avoid contact between these components until spraying is conducted. A suitable dual nozzle spraying mechanism for accomplishing this task is disclosed in U.S. Pat. Nos. 5,028,006 and 5,071,683. By keeping these components separate until immediately prior to spraying, a portion of the polyol reacts with the heat-activated aliphatic diisocyanate (and the hydroxyl and/or carboxyl pendent functional groups of the thermoplastic polyurethane) before all of the polyol can completely react with the polyisocyanate.

Furthermore, given the hygroscopic nature of the aromatic polyisocyanate component of the rapidly reacting composition, it is important that the outer layer 26 and the surrounding atmosphere (e.g., humidity levels) be substantially dry during this spraying step in order to obtain a strong interfacial chemical bond. While small amounts of moisture may be retained in the outer layer 26, the concentration of such moisture should not be so great as to permit the water to substantially interfere with the reaction between the polyol and polyisocyanate of the rapidly reacting composition. Undesirable reactions between the water and the polyisocyanate can disrupt the stoichiometric balance between the polyol and the polyisocyanate, leaving localized unreacted polyol deposits behind on the layered composite structure 24. The water also can serve as a blowing agent, reacting with the polyisocyanate to release carbon dioxide which imparts a cellular structure to the inner layer 28. Excess amounts of water also can deleteriously interfere with the crosslinking reaction effected via the polyol and the residual reactive sites of the blocked, heat-activated diisocyanate.

The rapidly reacting composition is preferably applied to the inner surface 26a of the outer layer 26 at an elevated temperature to advance these objectives. Suitable temperatures to which the first mold component 52 can be heated range, by way of example and without limitation, from about 60° C. (140° F.) to about 71.1° C. (160° F.).

As mentioned above, the inner layer 28 can also be formed by casting, for example, a PVC or thermoplastic polyurethane casting composition. Suitable techniques and apparati for accomplishing casting are disclosed in the collection of WO 98/57790, U.S. Pat. No. 4,623,503, U.S. Pat. No. 4,621,995, U.S. Pat. No. 5,597,586, and U.S. Pat. No. 4,217,325, the complete disclosures of which are incorporated herein by reference.

Generally, the inner layer 28 can have a thickness in a range of from about 0.10 cm to about 0.15 cm (that is, from about 0.040 inch to about 0.060 inch; or from about 40 mils to about 60 mils).

Aromatic Polyurethane Elastomer Inner Layer

Exemplary polyisocyanates that can be selected for forming the inner layer 28 include diisocyanates having aromatic closed-ring structures, such as diphenylmethane diisocyanate prepolymer (MDI prepolymer), which can be obtained from BASF Corp. of Wyandotte, Mich. under the trade designation ELASTOLIT M50555T, ISOCYANATE, NPU U05275, or diphenylmethane-4,4'-diisocyanate (MDI), or mixed isomers of MDI or mixtures of the above, which are available from BASF or Dow Chemical Corp. of Midland, Mich., Mobay (Bayer) Chemical Corp. of Baytown, Tex., or ICI America of Geismar, La. The above-mentioned non-light-stable aromatic polyisocyanates are very desirable for use in the inner layer in view of the higher rate of reactivity and completion of property development and better physical properties (e.g., tensile strength, elongation, and tear strength) of these non-light-stable aromatic polyisocyanate when compared to light-stable isocyanates such as isophorone diisocyanates, in which the —NCO groups are sterically hindered due to their spatial arrangement at either end of the molecule. By contrast, the aromatic diisocyanates used in this invention preferably have —NCO groups directly attached to the aromatic ring. In this preferred embodiment, the aromatic diisocyanates yield faster rates of reaction because of the arrangement and reactivity of the —NCO groups on the aromatic ring structure (e.g., in diphenylmethane diisocyanate) and the availability of the —NCO groups for reaction with the hydrogen donors of the —OH type residing on the organic chain of the polyols of the rapidly reacting composition.

Suitable polyols for this rapidly reacting composition include, without limitation, polyether polyols having average molecular weights in a range of from about 200 to about 2000 and containing one or more pendent hydroxyl and/or carboxyl groups in addition to primary hydroxyl groups, which can chemically react with unreacted functional —NCO groups of the blocked, heat-activated aliphatic diisocyanate and the hydroxyl and/or carboxyl pendent functional groups of the polyurethane of the outer layer 26. An exemplary polyol is ELASTOLIT M50555R NPU U05274 from BASF Corp. of Wyandotte, Mich.

The rapidly reacting composition can also contain appropriate additives, including, by way of example and without limitation, any combination of the following: heat and ultra-violet light stabilizers, pH stabilizers, antioxidants, dulling agents, surfactants, carbon black, chain extenders (e.g., ethylene glycol), thixotropic agents (e.g., amorphous silica), fillers such as clay particles, and catalysts such as tin catalysts (e.g., dibutyltin dilaurate).

Non-Aromatic Polyurethane Elastomer Inner Layer

Exemplary polyisocyanates that can be selected for making the inner layer 28 include polyisocyanates having closed aliphatic ring structures with pendent —NCO groups, such as isophorone diisocyanate, which can be obtained from Recticel under the tradename ISOFAST. Also suitable is tetramethyl xylene diisocyanate, which can be obtained from Texaco under the tradename TMXDI.

Suitable polyols for this rapidly reacting composition include, without limitation, polyether polyols having molecular weights in a range of from about 220 to about 250 and containing one or more pendent hydroxyl and/or carboxyl groups (in addition to primary hydroxyl groups), which can chemically react with unreacted functional —NH groups of the carbodiimide and the hydroxyl and/or carboxyl pendent functional groups of the polyurethane of the outer layer 26. An exemplary polyol is POLYFAST from Recticel.

Additives as mentioned above in connection with the aromatic polyurethane elastomer may be used for non-aromatic polyurethane elastomer inner layers 28 as well.

Cast PVC Inner Layer

Where PVC is selected as the base polymer, the casting composition can include one or more plasticizers. In a preferred embodiment, the plasticizers selected for this invention are capable of reacting with the crosslinker (e.g., carbodiimide) in the outer layer 26, so that the crosslinker can successfully crosslink the polyurethane of the outer layer 26 with the plasticizer of the casting composition. Exemplary plasticizers include, without limitation, plasticizers having one or more pendent hydroxyl or carboxyl functional groups. These plasticizers are preferably incorporated around the backbone of the base polymer as an internal lubricant.

Preferably, both a low molecular weight plasticizer and a medium molecular weight plasticizer are included in the casting composition having PVC as its base polymer. The low molecular weight plasticizer is selected to provide low temperature flexibility, so that performance of the inner layer 28 at low temperatures, such as −30° C., is not hindered. An exemplary low molecular weight plasticizer is di-2-ethylhexylphthalate (also known as DUP). On the other hand, the medium molecular weight plasticizer is selected to provide high temperature stability to the inner layer 28. An exemplary medium molecular weight plasticizer is trioctyltrimellitate (TOTM).

The amount of low molecular weight plasticizer should be maintained fairly low so as to reduce volatilization and, consequently, window fogging. For example, the weight ratio of low molecular weight plasticizer to PVC base resin in the casting composition can be from about 0.25:100 to about 1:100. The weight ratio of medium molecular weight plasticizer to PVC base resin in the casting composition can be in a range of from about 10:100 to about 40:100, and more preferably in a range of from about 20:100 to about 40:100. If an insufficient amount of medium molecular weight plasticizer is used, the inner layer 28 may not exhibit adequate high temperature aging properties, resulting in, for example, premature stiffening of the inner layer 28 after exposure to elevated temperatures. On the other hand, if an excess amount of medium molecular weight plasticizer is used, the article surface may tend to gloss at elevated temperatures, creating unacceptable surface reflectance.

Where PVC is selected as the base polymer of the casting composition, the casting composition can be prepared by any suitable technique, including suspension or mass polymerization followed by drying to provide a white, free-flowing powder of PVC having, for example, an average particle size of about 350 µm. The resulting PVC powder can then be thoroughly mixed with the plasticizer to form the casting composition by employing any suitable technique, such as high energy compounding. During compounding, the plasticizer is absorbed by the PVC and thereby causes the PVC to swell. Compounding can be performed, for example, at a temperature in a range of from about 150° F. (about 60° C.) to about 190° C. (about 88° C.).

The plasticizer selected should impart thermal stability to the PVC powder and be permanent to render the article flexible for the life of the application. Generally, PVC powder consists of discrete particle groups that, when subjected to excessive temperatures, decompose prior to melting. This decomposition liberates hydrogen chloride, which autocatalytically degrades the PVC. Since the PVC is melted during gelling and fusing steps, a suitable internal plasticizer is mixed with and absorbed in the PVC powder prior to casting in order to inhibit thermal degradation of the PVC and provide the inner layer 28 with a soft, flexible, compressing feel.

Preferably, the plasticizer is bound in the PVC matrix with sufficient bond energy to form a permanent part of the polymer matrix and thereby permit the finished fused article to exhibit good flexibility and weathering at super- and sub-ambient conditions in use.

The casting composition having PVC as its base resin can contain appropriate additives, including, by way of example and without limitation, any combination of the following: heat and ultra-violet light stabilizers, such as hydroquinones; internal lubricants, such as stearic acid; antioxidants; dulling agents; carbon black; and fillers, such as clay and/or diatomaceous earth. Other additives can also be introduced into the inner layer 28 to protect against oxidation and destabilization of the cast PVC. Such additives include barium, calcium, and zinc heat stabilizers, such as barium nonylphenate, calcium carboxylate, and zinc stearate. These and other additives can be included to form the dry resin material by using, by way of example and without limitation, a high intensity dry powder mixer such as a Henschel mixer.

In addition, the PVC composition can comprise one or more copolymer alloys or blends of PVC and another polymer, such as one or more polyurethanes. Such copolymer alloys and blends can be prepared by techniques well known to those skilled in the art, such as compounding.

Cast Thermoplastic Polyurethane Inner Layer

Where a thermoplastic polyurethane is selected as the base polymer for the casting composition, the thermoplastic polyurethane preferably contains at least one ethylenically unsaturated bond in its backbone and/or hydroxyl or carboxyl groups. In a preferred embodiment, the ethylenically unsaturated bond and/or hydroxyl groups of the thermoplastic polyurethane is/are capable of reacting with the crosslinker (e.g., carbodiimide) in the outer layer 26, so that the crosslinker can successfully crosslink the polyurethane of the outer layer 26 with the polyurethane of the casting composition. Exemplary thermoplastic polyurethanes include, without limitation, ESTANE (provided by B. F. Goodrich of Akron, Ohio) and PELLETHANE (provided by Dow Chemical Company of Midland Mich.).

The thermoplastic polyurethane of the casting composition can be prepared by, for example, a prepolymerization technique, followed by drying, compounding, chopping, and grinding, to provide a free-flowing powder of thermoplastic polyurethane. Excess polyols can be provided in preparing the thermoplastic polyurethane of casting composition. As mentioned above, the hydroxyl groups of the excess polyols can serve to promote crosslinking and the chemical bonding between the outer layer 26 and the inner layer 28. The resulting thermoplastic polyurethane powder typically has a brownish appearance, and can possess, for example, a 425 mesh size. The powder can contain additives, as needed or required by the intended use, to form the composition by employing any suitable technique, such as introducing the additives during prepolymerization. The weight ratio of the total additives to the base resin can be, for example, in a range of from about 3:100 to about 7:100, depending on the intended use and additives included.

The casting composition including a thermoplastic polyurethane as its base polymer can contain appropriate additives, including, by way of example and without limitation, any combination of the following: heat stabilizers; flexibilizers, such as low molecular weight polyurethanes (incorporated into the backbone, for example, during the compounding or like step); antioxidants; dulling agents; carbon black; fillers, such as clay particles; and free flowing additives. Other additives can also be introduced into the inner layer 28 to protect against scorching. These and other additives can be included to form the dry resin material by using, by way of example and without limitation, a high energy extruder/chopper.

In similar fashion, other thermoplastic powders based upon polyolefins or elastomers may be formed. Extruded micropellets of the PVC, TPU, TPO, TPE, or other thermoplastic formulations or combinations thereof may be cast instead of the powder form.

Various blends of polyether polyols and polyisocyanates having suitable resilience properties can be employed to form the semi-rigid polyurethane cellular foam of the intermediate layer 30. For example, the polyisocyanate blend can include methylene diisocyanate. The semi-rigid polyurethane cellular foam also can contain appropriate additives, including, by way of example and without limitation, any combination of the following: surfactants, antioxidants, fillers, stabilizers, catalysts such as tin catalysts (e.g., dibutyl tin dilaurate) and tertiary amines (e.g., diethanolamine), and small amounts of foaming agents such as water. In this regard, it is noted that the condensation reaction between the blends of polyols and polyisocyanates releases water, which reacts with the polyisocyanate to generate carbon dioxide and thereby impart the cellular structure to the intermediate layer 30. Accordingly, a slightly stoichiometric excess of polyol can be provided to form the semi-rigid polyurethane cellular foam.

Figure 10:
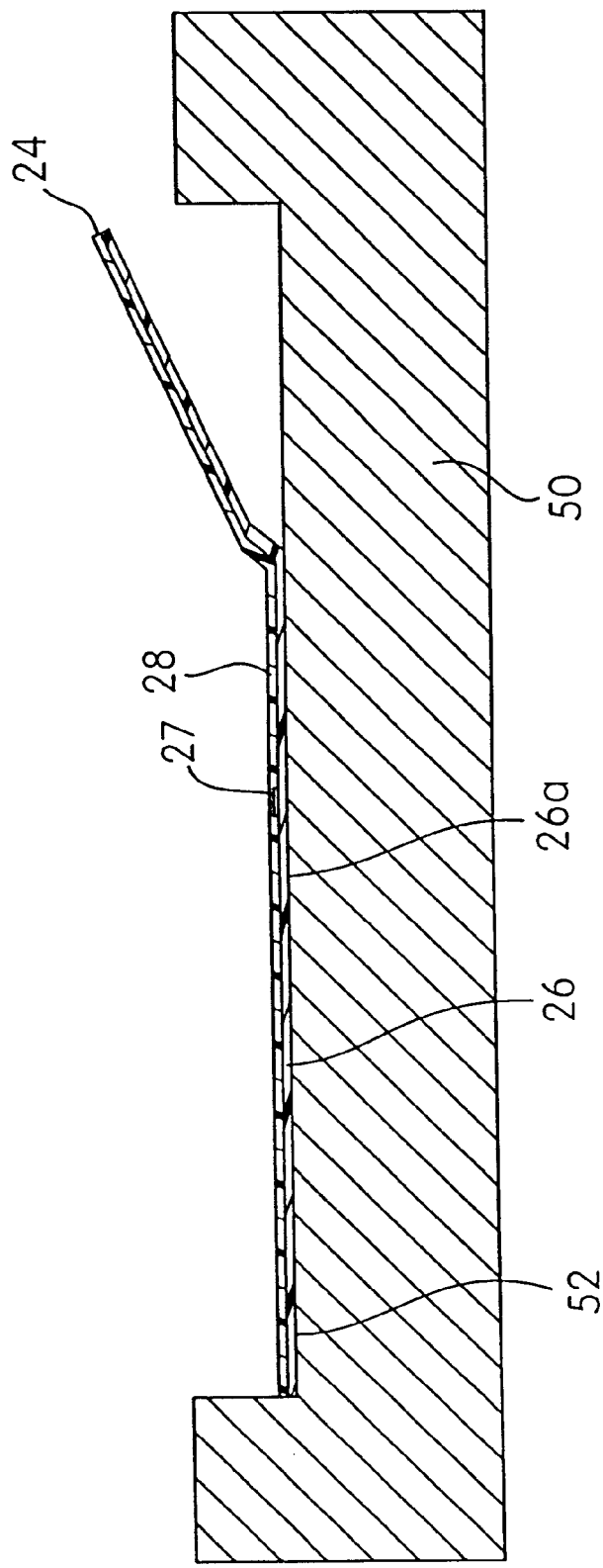
FIG. 10 is a sectional view similar to FIG. 9 showing a step of removing the layered composite structure from the mold surface.

FIG. 10 illustrates the next step of this embodiment, in which the layered composite structure 24 is demolded (i.e., removed) from the first mold surface 52. The demolding process is often a relatively labor intensive, tedious, and time consuming task. Formation of tears in or undue stretching of the layered composite structure 24 during demolding can irreversibly ruin and thereby necessitate disposal of the layered composite structure 24 as scrap. Such demolding problems and inefficiencies are largely overcome by practice of this invention, since the interfacial chemical bond between the outer layer 26 and inner layer 28 strengthens the layered composite structure 24 by discouraging separation of the outer and inner layer 26 and 28 and elongated structure 27 during demolding procedures. Moreover, such demolding problems and inefficiencies are further obviated by the use of the aromatic-based elastomer, since it has advantageous physical properties.

To enhance the releasability from the first mold surface 52 further, the mold surface 52 can be pretreated with a releasing agent. Exemplary releasing agents include, by way of example, high molecular weight microcrystalline wax mold releases, such as Chem-Trend PRC 7140, supplied by Chem-Trend, Inc. of Howell, Mich., or PRC 2006, also supplied by Chem-Trend. These mold releasing agents dry quickly on a heated mold within about 5 to about 10 seconds and form a release barrier between the grained mold surface 52 and the outer layer 26. Care should be taken to avoid the accumulation of the mold releasing agent on the first mold surface 52 or excess solids content in the agent, since such accumulation or excess solids content tends to fill the interstices of the decorative, grained mold surface 52, thereby removing from the exterior surface of the panel structure 10 the appearance of the intricate, hair-like grained configuration of the mold surface 52. Further, the use of excess mold releasing agents can cause the agents to transfer from the first mold surface 52 to the layered composite structure 24 during demolding of the composite structure 24, thus requiring additional wash-removal and drying steps after demolding and hence a loss in productivity.

After being demolded from the first mold surface 52, the layered composite structure 24, including the combination of the outer and inner layers 26 and 28 and narrow elongated structure 27, can be examined for defects with a light source (not shown) while the layered composite structure 24 is positioned on a transparent substrate (not shown). Such defects usually are present as cosmetic blemishes in the outer layer 26, and may include the presence of tears and rupturable portions lacking sufficient thickness to withstand stresses associated with demolding or the further processing steps, especially the uniting step. If minor and isolated, such localized defects can be remedied by post application of additional water-dispersed composition 54 onto the outer layer 26. Additionally, minor tears or thin areas can be repaired using thermoplastic, heat formable polyurethane tape on the backside 28b of the layered composite structure 24. Advantageously, the need to scrap the entire layered composite structure 24 is thereby averted. As a cautionary note, however, post application spray repair of surface 26a is generally undesirable and its use should be minimized to correcting localized defects, since post application spray repair can negate the grained leather-like appearance of the outer surface 26a of the outer layer 26 which is transcribed from the first mold surface 52.

As discussed in further detail below, the steps of demolding and examining of the layered composite structure 24 from the first mold surface 52 are not required to be conducted immediately subsequent to the formation of the layered composite structure 24. For example, the layered composite structure 24 optionally can be maintained against the first mold surface 52 until completion of the panel structure 10.

Optionally, the layered composite structure 24 can be retained in the first mold component 50 instead of being demolded and transferred to a second mold component 94 for the uniting step. Alternatively, the layered composite structure 24 can be returned to the first mold component 50 after being examined and treated.

Figure 11:
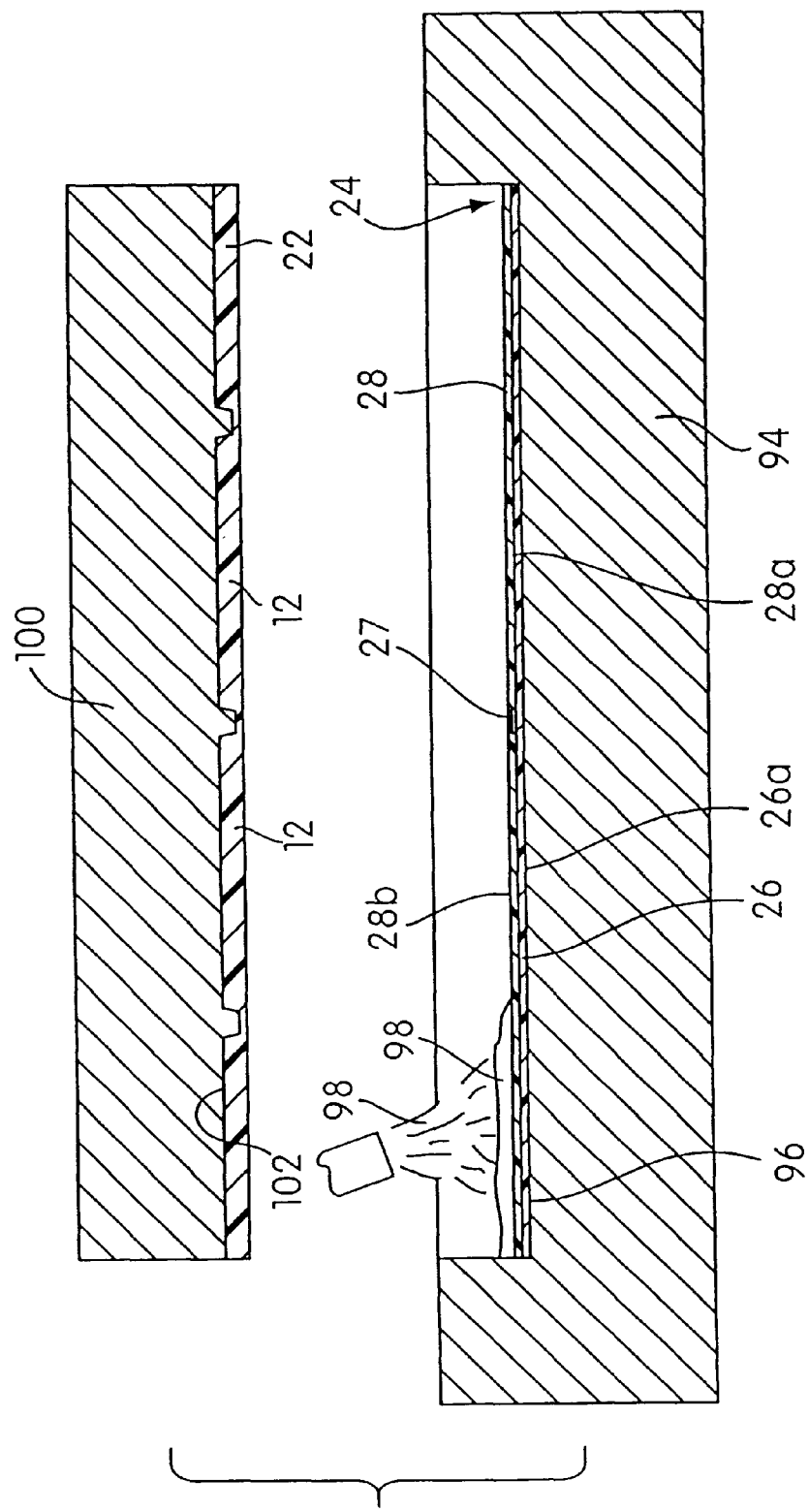
FIG. 11 is a sectional view showing a step of depositing a relatively rigid polyurethane cellular foam intermediate layer on the inner layer while the layered composite structure is disposed on a second mold surface.

After the layered composite structure 24 is demolded from the first mold surface 52 and examined, the layered composite structure 24 is placed on a second mold surface 96 of a second mold part 94. As shown in FIG. 11, the second mold surface 96 is shaped to have a complementary configuration to the outer layer 26. Then, a reactive mixture 98 for forming a semi-rigid cellular foam, such as a polyurethane semi-rigid cellular foam, is applied to an inner surface 28b of the inner layer 28 while the composite structure 24 is disposed on the second mold surface 96 to form the intermediate layer 30. The reactive mixture 98 can be applied, for instance, by employing high pressure impingement mixing and a mix-head nozzle. The second mold component 94 is generally heated to a temperature in a range of from about 35° C. to about 45° C., and more preferably in a range of from about 35° C. to about 40° C., during application of the reactive mixture 98. The mixture 98, which is typically relatively viscous, is in a transient state of reaction during application to the second mold component 94 and begins to foam within seconds of application.

Although the desired thickness of the intermediate layer is partially dependent upon the intended use of the panel structure 10, generally the intermediate layer can have a thickness in a range of from about 5 mm to about 12 mm.

Figure 12:
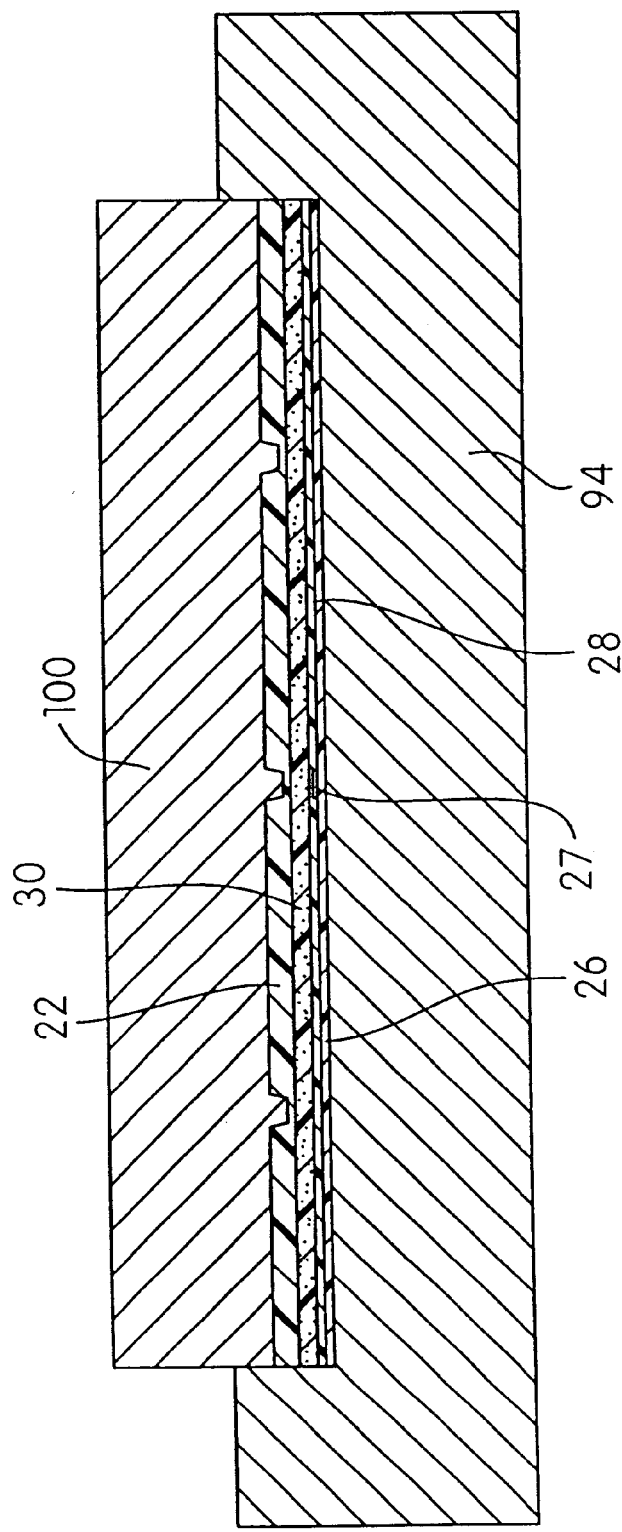
FIG. 12 is a sectional view showing a step of uniting the layered composite structure on the second mold surface with a pre-formed relatively rigid substrate disposed on a third mold surface.

Once the reactive mixture 98 has been applied to the layered composite structure 24 located on the second mold surface 96, a third cooperating mold part or component 100 carrying the pre-formed rigid substrate 22 having a doors 12 is moved into cooperating relation with the second mold component 94, as shown in FIG. 12. The third mold component 100 has a third mold surface 102 (FIG. 11) which is complementary to the interior surface 10b of the panel structure 10. Thereafter, the reactive mixture 98 is foamed and cured, preferably under heat of approximately 43.3° C. (110° F.) and a self-generated cavity pressure of about 0.8 atm to form the intermediate layer 30. The semi-rigid polyurethane cellular foam serves to unite the layered composite structure 24 with the pre-formed rigid substrate 22 disposed on the third mold surface 102. The panel structure including the combination of the layered composite structure 24, the rigid substrate 22, and the intermediate layer 30 then can be removed from the mold parts 94 and 100 and additional components can be affixed.

The rigid substrate 22 may be formed from any material possessing the requisite strength to reinforce and mount the outer layer 26, inner layer 28, and intermediate layer 30. Suitable materials include any material with sufficient rigidity to permit the composite to be mounted into a vehicular sub-structure, including, by way of example, injection molded thermoplastics, such as, without limitation, a styrene maleic anhydride (SMA), acrylonitrile butadiene styrene (ABS), polycarbonates (PC), an alloy of ABS-PC, reinforced reaction injection molded polyurethanes (RRIM), metals, metal alloys, wood-fiber composites, or any combination thereof. Fillers can be used in the substrate 22, as is known in the art.

The reinforcing substrate 22 may optionally also include reinforcement nanoparticles comprising platelet minerals dispersed in the desired polymer in desired ratios. The components can be blended by general techniques known to those skilled in the art. For example, the components can be blended and then melted in mixers or extruders.

The illustrated embodiment of this invention can also be modified by applying the reactive mixture 98 for forming the polyurethane semi-rigid cellular foam 30 to the surface of the rigid substrate 22 instead of the layered composite structure 24. Alternatively, the second and third mold components 94 and 100 can be cooperatively engaged to define a cavity between the inner surface 28b of the inner layer 28 and the outer surface of the substrate 22, with the reactive mixture 98 thereafter being injected between the rigid substrate 22 and the composite structure 24.

Additional specific preferred methods, for the purposes of this invention, for forming a polymer composite having dispersed therein exfoliated layered particles are disclosed in U.S. Pat. Nos. 5,717,000, 5,747,560, 5,698,624, and WO 93/11190. For additional background the following are also references: U.S. Pat. Nos. 4,739,007 and 5,652,284.

Where the doors separate from each other during deployment of the air bag, the doors can be attached to the substrate with hinge components or tether devices to ensure that the doors do not become projectiles during actuation of the air bag assembly. Suitable connecting means and arrangements for practice in this invention are disclosed in U.S. Pat. Nos. 5,456,490, 5,222,760, 5,569,959, and 5,560,646. Where the doors are integrally molded, the doors can be reinforced at the hinged or tethered areas.

The second embodiment of this invention will now be described with reference to FIGS. 13–17. In describing the second embodiment, identical reference numerals to those used in FIGS. 1–12 will be used to describe structures and parts having similar properties or functions to those of the first embodiment. For the purpose of brevity, steps and features involved in the second embodiment that are the same as those described above in connection with the first embodiment will not be repeated hereinbelow.

Referring now more particularly to the drawings, and in particular FIGS. 13 and 14, in accordance with this second embodiment, the layered composite structure 24 comprises the outer layer 26 and the inner layer 28, and a seam defining structure, namely a thin sheet structure 29 interposed therebetween (or partially or fully embedded within the inner layer 28). The thin sheet structure 29 overlays a portion of the outer layer 26 corresponding to the portion of the layered composite structure 24 through which the doors 12 move during the operation of the secondary restraint system 40. The thin sheet structure 29 is severed in a position and configuration to define an exteriorly invisible tear seam generally conforming to a portion of the outline of the movable doors 12.

During deployment of the air bag 42, the expanding air bag 42 impacts against the backside of the panel structure 10 and fractures the composite structure 24 along the severed portion of the thin sheet structure 29 to create a passageway. The formed passageway permits expansion of the air bag 42 into the passengers' compartment of the vehicle and protects the occupants from violent collision against the panel structure 10 or windshield 16.

Referring to FIGS. 15 and 16, there are shown two constructions of the thin sheet structure 29 with an H-shaped pattern 31 severed therein. The pattern should correspond to the movable portion of the doors 12. The thin sheet structure 29 is severed in a position and configuration to define an exteriorly invisible tear seam generally conforming to an outline of the movable doors 12. As referred to herein, severing includes the formation of continuous or non-continuous cuts or perforations or channels (having a width), and cuts or perforations or channels that pierce all or only a portion of the thickness of the thin sheet structure 29.

As shown in FIG. 15, the sheet structure 29 is constructed as a continuous sheet, which may be made of a thermoplastic material. Among the materials suitable for preparing the continuous sheet structure 29 are MYLAR polyester, polyurethane, or polyamide (Nylon) film with adhesive backing to self-adhere to the outer layer 26 while the polyurethane elastomer inner layer 28 is applied. The size of the sheet 29 may be, for example, on the order of 30 mm by 38 mm, with a thickness on the order of from about 0.1 mm to about 0.2 mm. The pattern of the severed film depends on the configuration of the outline of the doors 12.

As shown in FIG. 16, alternatively the sheet structure 29 may be formed from a mesh with a severed portion, designated by reference numeral 31. The mesh (or a porous layer) is advantageous inasmuch as it contains voids through which the outer and inner layer 26 and 28 may contact and undergo interfacial chemical bonding. It has even been observed that during deposition of the inner layer 28, the mesh sheet structure 29 may be lifted from the surface 26b of the outer layer 26 and encapsulated in the inner layer 28. The mesh may be made of spunbonded polyester (available from Reemay located in Old Hickory, Tenn.) or fiberglass mesh or polyester non-woven cloth, to name a few examples. The mesh should have a heat-activated adhesive coupling agent compatible to bond with the inner layer 28 and so as to maintain the mesh in place during the application of the inner layer 28. The mesh sheet 29 may have dimensions on the order of from about 30 mm to about 38 mm with a thickness in a range of from about 0.1 mm to about 0.2 mm.

The thin sheet structure 29 applied to the inner surface 26b of the outer layer 26 and replaces the elongated structure 27 and the process steps associated therewith. Otherwise, the process steps are identical with the first embodiment.

The thin sheet structure 29 is substantially larger than the area of the opening through which the doors 12 egress, but may have a lesser width and height than the inner and outer layers 26 and 28. As with the first embodiment, the inner layer 28 may be formed from a variety of different base polymers and additives; however, the use of a polyurethane elastomer, especially an aromatic polyurethane elastomer, is preferred.

In another alternative method as illustrated in FIG. 18, the sheet structure 29 is provided with peripheral walls that extend perpendicular from the plane of the sheet structure 29 so as to define an open ended box. The peripheral walls face away from the first mold surface 52 and protrude from the inner surface 28b of the inner layer 28. The protruding portions of the peripheral walls are attached to substrate 22. The attachment of the sheet structure 29 to the substrate 22 localizes elongation of the outer and inner layers 26 and 28 (caused during movement of the doors 12 through the layered composite structure 24) to those portions of the layers 26 and 28 located within the area defined by the peripheral walls of the sheet structure 29. As a consequence, the portions of the layered composite structure 24 located outside of the area defined by the peripheral walls of the sheet structure 29 are not subjected to excess elongation and are less likely to separate from the rigid substrate 22 and the optional cellular foam 30. This embodiment is especially useful for panel designs that do not provide sufficient area of support for the layered composite structure 24, permitting the sheet structure 29 to be self-restraining (relative to the layered composite structure 24) during airbag deployment.

Although the method of this invention has been embodied above in connection with the preparation of a instrument panel, it is understood that the method is equally applicable to other panel structures, including for example door panels, interior rear quarter panels, pillar covers and headliners.

The foregoing detailed description of the preferred embodiments of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the scope of the appended claims.

What is claimed is:

1. A layered composite structure for a panel structure of a motor vehicle comprising:
   an outer layer having an inner surface and an outer surface, the outer surface defining an exposed exterior surface of the panel structure, the outer layer comprising a substantially non-cellular thermoplastic polyurethane and a cross-linker;
   an inner layer disposed adjacent to the inner surface of the outer layer, the inner layer comprising one or more substantially non-cellular base polymers; and
   a seam defining structure disposed in the inner layer or between the inner layer and the outer layer, the seam defining structure defining tear seam for fracturing in response to operation of a secondary restraint system, the seam defining structure not being visible from the exposed exterior surface, wherein the layered composite structure comprises interfacial chemical bonding between the inner surface of the outer layer and an adjacent surface of the inner layer.

2. A layered composite structure as defined in claim 1, wherein the outer layer has a thickness in a range of from about 0.0025 cm to about 0.0038 cm.

3. A layered composite structure as defined in claim 1, wherein the inner layer has a thickness in a range of from about 0.10 cm to about 0.15 cm.

4. A layered composite structure as defined in claim 1, wherein the layered composite structure has a configuration of an exterior surface of a door panel.

5. A layered composite structure as defined in claim 1, wherein the layered composite structure has a configuration of an exterior surface of an instrument panel.

6. A layered composite structure as defined in claim 1, wherein the inner layer comprises an aromatic polyisocyanate, and wherein the cross-linker comprises a blocked, heat-activated diisocyanate.

7. A layered composite structure as defined in claim 1, wherein the outer layer further comprises at least one of a heat stabilizer and a light stabilizer.

* * * * *